Patented Mar. 8, 1949

2,463,740

UNITED STATES PATENT OFFICE 2,463,740

PREPARATION OF PEANUT PROTEIN FREE FROM PEANUT SKIN PIGMENT

Raymond S. Burnett, New Orleans, La., assignor to the United States of America as represented by the Secretary of Agriculture No Drawing. Application March 29, 1946, Serial No. 658,201

17 Claims. (Cl. 99—17)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to the removal of soluble coloring matter (pigments) from the skins (testa) of ordinary varieties of peanuts which are intended for use as a source of peanut protein. Failure to remove this natural coloring matter results in the production of a peanut protein which is too dark for the manufacture of many products which can be produced from this otherwise valuable raw material.

The process ordinarily employed for the manufacture of protein from peanuts is briefly as follows: The peanuts are first shelled and cleaned and the oil removed from the kernels, or meats, by well known methods such as pressing in hydraulic, screw, or cage presses, solvent extraction, and so forth. The residual meal contains varying amounts of oil from less than 1 percent to 8 to 10 percent and represents the raw material used in the manufacture of peanut protein. However, in order to produce a light colored meal or protein, consideration must be given to the reduction or removal of the pigments, or coloring matter, prior to separation of the peanut kernels into oil and meal.

In order to isolate the protein from the meal, the meal is first mixed with water, or dilute alkali, or sometimes with dilute acid. This step in the process dissolves sugars, proteins, and other soluble materials from the meal and, unfortunately, a considerable, but variable, amount of the coloring matter present in the skins. In order to obtain practical yields of protein, its extraction from peanut meal must be made at pH values where the solubility of the protein is high. The solution thus obtained is separated from the insoluble meal residue by any suitable means, such as screening, centrifugation, or filtration.

The clarified, or partially clarified protein solution obtained is then adjusted to a pH value within the isoelectric range of the protein by the addition of acid or alkali in order to precipitate the protein from the solution. The sugars and most of the other impurities remain in the supernatant liquor, but a portion of the coloring matter is precipitated along with the protein. The protein curds thus obtained are separated from the bulk of the supernatant liquor and dried prior to use in the preparation of protein fibers, adhesives, paper coatings, and so forth. Peanut proteins thus extracted and precipitated at any pH values which are concomitant with a practical yield of protein are always contaminated with sufficient coloring matter from the skins to make the protein too dark for many industrial purposes.

The preparation of skin-free peanut kernels for the manufacture of peanut butter, candy, peanut flour, and other peanut food products, is accomplished by so-called blanching, a process which involves loosening the skins by drying the kernels and subsequently removing the loosened skins by mechanical means. The drying process is accelerated by heating the peanut kernels to relatively high temperatures, and as a result, the protein of the kernels is damaged insofar as its usefulness for most industrial purposes is concerned. This is especially true when the protein is to be used for the preparation of synthetic protein fibers. Furthermore, the cost of the blanching process is high and must be borne entirely by the derived protein when blanched (skin-free) peanut kernels are employed for preparing peanut meal for use as a source of protein.

I have discovered that soluble pigments in peanut skins (testa) can be removed from the peanut kernels by exposing them to dilute acid or alkali solutions for a short period of time. The dilute acid, or alkali, removes the soluble coloring matter in a few seconds, and the excess acid, or alkali, is then rinsed from the peanut kernels by water. A satisfactory basket for holding the kernels during the alkali treatment and rinsing can be made from wire screen of suitable mesh, supported by a framework. Such baskets can be used for batch or continuous processing of the kernels.

During this treatment, considerable amounts of water are absorbed by the kernels and may amount to approximately 35 parts for each 100 parts by weight of kernels. This water must be partially removed by drying prior to processing the peanut kernels for separation into oil and meal. The amount of water permitted to remain in the kernels will depend somewhat on the process to be employed for removing the oil but ordinarily, drying to a water content of 10 percent is satisfactory.

Analysis of the acid or alkali solution and the rinse water shows that only a few tenths of one percent of the oil or protein present in the peanut kernels and skins is removed by this process. Thus, the surfaces of the kernels appear to behave as semipermeable membranes which admit water to the interior of the kernels but exclude acid or alkali. This specificity of action is further indicated by the fact that the alkali- or acid-washed and water-rinsed peanut kernels are free of acid or alkali, as shown by the pH value of the treated kernels, which is near pH 7.0.

Acid can be used to remove part of the color from peanut skins, and this might seem to be necessary for the preparation of protein by extraction of the peanut meal by acid solutions. However, I have found that the treatment of the peanuts with alkali also removes most of the acid soluble pigment, or color bodies, from the peanut skins.

The following examples illustrate the present invention, although the invention is not restricted to these examples:

Example I 100 parts of shelled peanuts (kernels) are placed in a wire basket having a cover which can be securely fastened. The basket of peanut kernels is then placed in a 0.5 percent solution of sodium hydroxide and the solution agitated to expedite removal of the color from the skins. The basket of treated (decolorized) peanut kernels is removed from the lye bath after about one minute of exposure, and the peanut kernels are freed of excess sodium hydroxide by rinsing or spraying with water. The peanut kernels are then dried to about 10 percent water content or less and processed for separation into oil and meal by solvent extraction, hydraulic pressing, or other means. The meal, thus prepared, can be used to prepare a peanut protein, by any suitable means, which is practically free of the color originally present in the peanut skins.

Example II 100 parts of shelled peanuts are placed in a wire basket having a cover which can be securely fastened. The basket of peanuts is then placed in a 1.0 percent solution of sodium carbonate and the solution agitated so that removal of the color from the skins is expedited. The basket of decolorized peanuts is removed from the sodium carbonate bath after about one minute of exposure and the peanuts are freed of excess sodium carbonate by rinsing or spraying with water. The peanut kernels are then dried to about 10 percent water content or less and processed for separation into oil and meal by solvent extraction, hydraulic pressing, or other means. The meal, thus prepared, can be used to prepare a peanut protein, by any suitable means, which is practically free of the color originally present in the peanut skins.

Example III 100 parts of shelled peanuts are placed in a wire basket having a cover which can be securely fastened. The basket of peanuts is then placed in a 1.0 percent solution of hydrochloric acid, and the solution is agitated so that removal of the color from the skins is expedited. The basket of decolorized peanuts is removed from the hydrochloric acid bath after about one minute of exposure, and the peanuts are freed of excess hydrochloric acid by rinsing or spraying with water. The peanut kernels are then dried to about 10 percent water content or less and processed for separation into oil and meal by solvent extraction, hydraulic pressing, or other means. The meal, thus prepared, can be used to prepare a peanut protein, by any suitable means, which is practically free of the color originally present in the peanut skins.

Example IV 100 parts of shelled peanuts are placed in a wire basket having a cover which can be securely fastened. The basket of peanuts is then placed in a 1.0 percent solution of sulfuric acid, and the solution is agitated so that removal of the color from the skins is expedited. The basket of decolorized peanuts is removed from the sulfuric acid bath after about one minute of exposure, and the peanuts are freed of excess sufuric acid by rinsing or spraying with water. The peanut kernels are then dried to about 10 percent water content or less and processed for separation into oil and meal by solvent extraction, hydraulic pressing, or other means. The meal, thus prepared, can be used to prepare a peanut protein, by any suitable means, which is practically free of the color originally present in the peanut skins.

The effectiveness of the use of 0.5 percent sodium hydroxide solution for removal of coloring matter from the skins of peanuts can be shown in the following table by comparing the color of solutions of the finished proteins isolated from peanuts, which were exposed to 0.5 percent sodium hydroxide solution for 1 minute, with the color of solutions of protein prepared from untreated red skin peanuts and from blanched (skin-free) peanuts.

| Peanuts used as source of protein | Color of solutions of protein expressed in I. C. I. tristimulus system | | |
| --- | --- | --- | --- |
| | Dominant wave length | Purity | Luminous transmittance |
| | *Mu* | *Percent* | *Percent* |
| Peanuts which were exposed to 0.5% NaOH solution | 571 | 7.8 | 94.9 |
| Untreated red skin peanuts | 581 | 27.0 | 65.3 |
| Blanched (skin-free) peanuts | 570 | 5.4 | 95.6 |

Having thus described my invention, I claim:

1. A process of removing pigment from the skins of shelled peanuts comprising exposing unskinned, shelled peanuts in the form of kernels to a dilute alkaline solution for a period of time of such short duration that little or no oil and protein present in the peanut kernels and skins is removed.

2. The process of claim 1 in which the alkaline solution is a solution of sodium hydroxide of about 0.5 percent concentration.

3. The process of claim 1 in which the alkaline solution is a solution of sodium carbonate of about 1.0 percent concentration.

4. A process comprising exposing unskinned, shelled peanuts in the form of kernels to a dilute acidic solution to remove coloring matter from the skins, thereafter separating the oil, leaving a peanut meal containing the protein of the peanut skin and of the peanut kernel.

5. A process of removing pigment from the skins of shelled peanuts comprising exposing unskinned, shelled peanuts in the form of kernels to a dilute acidic solution for a period of time of such short duration that little or no oil and protein present in the peanut kernel and skin is removed.

6. The process of claim 4 in which the acidic solution is hydrochloric acid in about 1 percent concentration.

7. The process of preparing peanut kernels for separation into oil and meal comprising the steps recited in claim 1, and subsequently drying the peanuts to a water content of about 10 percent or less.

8. The process of claim 1 in which the alkaline solution is about 0.5 percent aqueous sodium hydroxide and the exposure is for about 1 minute, or less.

9. The process of claim 1 in which the alkaline solution is aqueous sodium carbonate of about 1 percent concentration, or less.

10. A process for removing pigment from the skins of shelled peanuts comprising exposing shelled, unskinned peanuts in the form of kernels, for a period of time of such short duration that little or no oil and protein present in the peanut kernels and skins is removed, to a dilute reagent of the group consisting of bases and acids, and then washing the peanuts 11. In a process of preparing peanut meal, the steps comprising exposing shelled unskinned peanuts in the form of kernels to a dilute aqueous alkaline solution for a period of time sufficient to remove the pigment from the skins but of such short duration that little or no oil and protein present in the peanut kernels and skins is removed, washing the treated unskinned peanuts, drying the peanuts, and separating the oil from the peanuts, leaving a peanut meal containing peanut skin protein.

12. The process of claim 11, in which the period of time is no more than about one minute.

13. In a process of preparing peanut meal, the steps comprising exposing shelled, unskinned peanuts in the form of kernels to a dilute reagent of the group consisting of bases and acids for a period of no more than about one minute at room temperature, to remove the pigment from the skin, and thereafter separating the oil from the unskinned peanut.

14. In a process of preparing peanut meal free from the pigment in the peanut skin, the steps comprising exposing shelled, unskinned peanuts in the form of kernels to a dilute aqueous alkaline solution for a period sufficient to remove the pigment from the skins, and thereafter separating the oil, leaving a peanut meal containing the protein of the peanut skin and of the peanut kernel.

15. A process for preparing protein from peanuts, comprising exposing shelled, unskinned peanuts in the form of kernels to a dilute aqueous alkaline solution to remove pigment from the skins, the exposure being for a time of such short duration that little or no oil and protein present in the peanut kernels is removed, and thereafter washing the kernels, separating the oil to leave a meal, and removing protein from the meal.

16. The process of claim 15 in which the solution is of sodium hydroxide.

17. The process of claim 15 in which the solution is of sodium carbonate.

RAYMOND S. BURNETT.

REFERENCES CITED

The following references are of record in the file of this patent:

UNITED STATES PATENTS

| Number | Name | Date |
| --- | --- | --- |
| 1,314,298 | Yamamoto | Aug. 26, 1919 |
| 1,344,638 | Kinsman | June 29, 1920 |
| 1,433,168 | Yamamoto | Oct. 24, 1922 |
| 2,108,915 | Bullard et al. | Feb. 22, 1938 |